United States Patent Office 2,791,574
Patented May 7, 1957

2,791,574

PRODUCTION OF (OLEFINICALLY UNSATURATED ACYLOXY) HALOALKOXY PHOSPHORUS COMPOUNDS

William M. Lanham, Charleston, W. Va., assignor to Union Carbide and Carbon Corporation, a corporation of New York No Drawing. Application August 6, 1953,
Serial No. 372,814

18 Claims. (Cl. 260—89.5)

This invention relates to the preparation of novel olefinically unsaturated acyloxy derivatives of haloalkyl phosphate and phosphonate esters; and more especially it concerns the production of novel compounds of this type by reacting epoxy-containing unsaturated carboxylic acid esters with phosphorous oxyhalides, or with derivatives of the latter having at least one halogen atom directly connected with the phosphorus atom.

These monomeric compounds are readily polymerizable, either alone or in admixture with other polymerizable organic compounds containing one or more olefinic double bonds, such as the esters of acrylic and methacrylic acids, acrylonitrile, acrylamide, the vinyl halides, and the vinyl esters of lower alkanoic acids such as vinyl acetate, and the esters of unsaturated carboxylic acids, either in the presence or absence of an added polymerization catalyst, such as an acyl peroxide. This invention includes the production of the polymers of the novel monomers.

The monomeric compounds of the invention have important prospective utility for the preparation of resin compositions, and as textile treating agents. Many of the compounds exhibit biological activity. The compounds are useful as intermediates in the production of amines, alcohols, mercaptans and other derivatives. The novel polymers have utility in the production of coating and impregnating compositions, and for other purposes.

Among the more important objects of this invention are the provision of the following: a novel class of olefinically unsaturated acyloxy derivatives of haloalkyl phosphate and phosphonate esters; the production in novel manner of such compounds from epoxy-containing esters of unsaturated carboxylic acids having at least one olefinic double bond; and the production of polymers of such compounds.

According to the invention in its preferred form an epoxy-containing unsaturated carboxylic ester, and preferably one having a structure designated by the formula

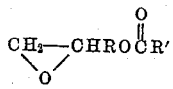

wherein R designates a divalent —CH₂— or —CH₂CH₂— radical and R designates a hydrocarbon radical containing at least one olefinic double bond, is reacted, in the presence as catalyst of certain halogen-containing compounds of titanium, zirconium, aluminum and tin, respectively, with a phosphorous-containing reactant such as a phosphorous oxyhalide, or an ester of a mono- or dihalogen-substituted phosphoric acid or corresponding phosphonic acid. The phosphorus-containing reactant preferably has a structure designated by the formula

wherein each Y designates a radical of the class consisting of chlorine, bromine, alkoxy, chloroalkoxy, bromoalkoxy, aryloxy, aryl, chloroaryloxy and bromoaryloxy radicals, and the two Y's together designate the group

wherein $R^2$, $R^3$, $R^4$, $R^5$, and $R^6$ designates hydrogen or an alkyl group; and Hal designates a radical of the class consisting of chlorine and bromine.

Where a phosphoryl halide or an open chain derivative thereof is used as reactant it is believed that the principal reaction proceeds according to the following equation:

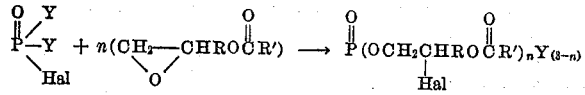

where Y, Hal, R and R' have the designations previously indicated, and $n$ is an integer from 1 to 3. The oxirane ring also may open so as to yield the product

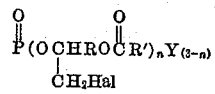

When using a 2-halo-substituted 2-oxo-1,3-2-dioxaphosphorinane the reaction apparently proceeds as follows:

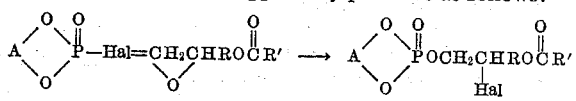

wherein R, R' and Hal have the meanings hereinbefore designated, and A designates the divalent group

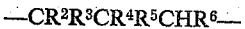

previously described.

While the reaction is operative at temperatures within the range from 25° C. to 125° C., it preferably is conducted at temperatures within the range between 50° C. and 70° C. under which conditions a satisfactory reaction speed is secured, while polymerization of the unsaturated compounds does not occur appreciably at these temperatures. The carboxylic acid ester linkage and the olefinic double bond remain unchanged. The reaction usually is exothermic and it is necessary to cool the reaction mixture in order to maintain it at 50° C.–70° C.

The preferred catalysts are the tetrachlorides and tetrabromides of titanium and zirconium. It is possible to use the oxides and other compounds of these metals capable of forming the halides when dissolved in the phosphorus-containing reactant. Also effective as catalysts are the stannic tetrahalides, and the aluminum trihalides, such as the chlorides and bromides.

The amount of catalyst employed can vary considerably. As little as 0.15% of catalyst, based upon the weight of the phosphorus-containing reactant, can be used effectively. However, from 0.5% to 3.0% or more of the catalyst preferably is used.

While it is preferred to use a slight excess of the epoxy-containing unsaturated carboxylic ester to insure completion of the desired reaction under favorable temperature conditions, the two reactants can be used in stoichiometric proportions.

In practicing the invention, preferably one of the reactants is slowly introduced, often dropwise, into the other reactant, in the presence of the catalyst and desirably in the presence of a polymerization inhibitor of any well known type useful for inhibiting polymerization of olefinically unsaturated carboxylic compounds, such as 1,3,5-trinitrobenzene, hydroquinone, tannic acid, phenol, naphthols, cupric salts, such as cupric acetate, and methylene blue. Usually for best results the epoxy compound containing a polymerization inhibitor is slowly added dropwise with agitation to a solution of the catalyst in the other reactant, while abstracting heat of reaction.

The monomeric products of the reaction can be recovered by any of various procedures. Preferably the reaction mixture is agitated with an aqueous solution of trisodium citrate, sodium tartrate or potassium sodium tartrate, which form water-soluble complexes with the catalyst, and the organic layer then is washed with water to remove such complexes. The washed product is freed from water by distillation under vacuum, after addition of a small amount of a polymerization inhibitor, such as those hereinbefore disclosed, or phenyl-alpha-naphthyl-amine.

Also, the reaction mixture can be neutralized with an aqueous slurry of calcium or barium carbonate, filtered, a small amount of a polymerization inhibitor added to the filtrate, and the latter stripped of excess reactants under vacuum.

Among novel monomeric compounds of the invention are those of the general formula

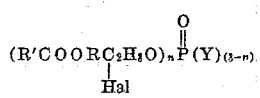

wherein R designates a divalent methylene or ethylene radical; R' designates an unsaturated hydrocarbon radical containing at least one olefinic double bond and preferably having from 2 to 20 carbon atoms; Hal designates chlorine or bromine; and each Y designates respectively a radical of the class consisting of chlorine, bromine, the alkoxy, the aryloxy, the aryl, and the chlorine-substituted and the bromine-substituted alkoxy and aryloxy radicals; and two Y's together designate the group

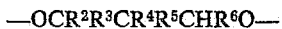

wherein $R^2$, $R^3$, $R^4$, $R^5$ and $R^6$ designate, respectively, hydrogen or an alkyl group; and such $n$ is an integer from 1 to 3.

Among the compounds of phosphorus useful as starting materials in the process are phosphoryl chloride, the phosphoryl chloride-bromides and phosphoryl bromide; mono- and di-alkyl chlorophosphates and bromophosphates such as di-butyl chlorophosphate, monobutyl dichlorophosphate, di-(2-ethylhexyl) chlorophosphate and di-(dodecyl) chlorophosphate; the cycloalkyl chloro- and bromo-phosphates such as di(cyclohexyl) chlorophosphate; the aryl and diaryl halophosphates such as diphenyl chlorophosphate, phenyl dichlorophosphate, phenyl dibromophosphate, p-tert-butylphenyl dichlorophosphate and cresyl dichlorophosphate; the halogen-substituted alkyl and aryl halophosphates such as 2-chloroethyl dichlorophosphate, di-(2-chloroethyl) chlorophosphate, 2-bromoethyl dibromophosphate, p-chlorophenyl dichlorophosphate and di(p-chlorophenyl) chlorophosphate; the alkoxyalkyl, polyalkoxyalkyl, aryloxyalkyl and aryloxypolyalkoxyalkyl halogenated phosphates such as the methoxyethyl, methoxyethoxyethyl, butoxyethyl, phenoxyethyl and phenoxyethyloxyethyl mono- and dichlorophosphates and bromophosphates; the phosphonyl dihalides, such as benzenephosphonyl dichloride and the corresponding dibromide, p-tert-butyl-benzenephosphonyl dichloride, o-methylbenzenephosphonyl dichloride, ethanephosphonyl dichloride and butanephosphonyl dichloride; and the 2-chloro- and 2-bromo-derivatives of the unsubstituted and ring carbon alkyl-substituted 2-oxo-1,3,2-dioxaphosphorinanes.

Epoxy-containing unsaturated carboxylic esters useful in the process include the glycidyl and 3,4 epoxybutyl esters of unsaturated olefinic monocarboxylic acids such as acrylic, alpha-methacrylic, alpha-ethacrylic, crotonic, nonylenic, 2-methyl-2-butenoic, 4-hexenoic, sorbic and oleic acids.

The 2-halo-2-oxo-1,3,2-dioxaphosphorinanes used as starting materials in certain modifications of the invention can be produced by reacting a phosphoryl halide with a 1,3-alkanediol, such as 1,3-hexanediol, at temperatures around 25° C. or below, preferably in the presence of an inert solvent for the reactants and, if desired, of a sequestering agent for the by-product hydrogen halide.

For example, a high yield of 2-chloro-5-ethyl-2-oxo-4-propyl-1,3,2-dioxaphosphorinane was secured by adding 4 moles of 2-ethyl-1,3-hexanediol slowly to 4 mols of phosphoryl chloride maintained at 25° C. under an absolute pressure of 500 mm. of mercury. The reaction mixture then was held for 16 hours at this temperature under 5 mm. of mercury pressure. The residue was the desired product.

The following examples serve to illustrate the invention:

*Example 1*

To an agitated solution of 4 grams of titanium tetrachloride in 340 grams (1.5 mols) of 2-chloro-5-ethyl-2-oxo-4-propyl-1,3,2-dioxaphosphorinane were slowly added during 1.25 hours 227 grams (1.6 mols) of glycidyl methacrylate containing 0.21 gram of 1,3,5-trinitrobenzene as polymerization inhibitor, while cooling to maintain the reaction mixture at 50° C., for a total of 1.75 hours. The mixture then was neutralized at 25° C. with 300 grams of a 10% aqueous solution of trisodium citrate. The oil layer which separated was isolated, washed with 300 cc. of water at 25° C., 1 gram of 1,3,5-trinitrobenzene added, and the mixture stripped by pot distillation to 50° C. under 2 mm. of mercury pressure. The slightly yellow liquid residue of 5-ethyl-2-methacrylyloxychloropropoxy-2-oxo-4-propyl-1,3,2-dioxaphosphorinane having the structure

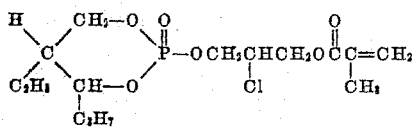

was secured in a yield of 93% (based on the phosphorus-containing reactant).

It had the following characteristics: $n_D^{30}=1.4675$;

| Analysis | Found | Theory |
|---|---|---|
| P, percent by weight | 8.27 | 8.40 |
| C, percent by weight | 47.23 | 48.87 |
| H, percent by weight | 7.15 | 7.11 |
| Cl, percent by weight | 9.95 | 9.62 |
| Molecular weight (ebullioscopic) | 359 | |
| Molecular weight (by unsaturation) | 354.7 | |

*Example 2*

To an agitated solution of 1 gram of zirconium tetrachloride in 57 grams (0.25 mol) of 2-chloro-5-ethyl-2-oxo-4-propyl-1,3,2-dioxaphosphorinane held at 44°–50° C. there were added dropwise during 0.5 hour 39 grams (0.27 mol) of glycidyl α-methacrylate containing 0.04 gram of 1,3,5-trinitrobenzene. Then 1 gram of zirconium tetrachloride was added and the reaction mixture held at 50° C. for two additional hours. The reaction mixture then was neutralized with 150 grams of a 15% aqueous solution of trisodium citrate, the oil layer was separated, washed with water, and 0.25 gram of 1,3,5-trinitrobenzene added as a polymerization inhibitor. The treated oil layer was stripped by distillation to a kettle temperature of 50° C. under 0.7 mm. of mercury pressure. The residual 5-ethyl-2-methacrylyloxychloropropoxy-2-oxo-4-propyl-1,3,2-dioxaphosphorinane, obtained in 92% yield, based upon the phosphorus-containing reactant, was a liquid having a refractive index $n_D^{30}=1.4666$ In a similar experiment, but wherein no catalyst was used, no appreciable reaction occurred; and none of the desired product was obtained.

*Example 3*

To an agitated solution of 0.5 gram of titanium tetrachloride in 59 grams (0.24 mol) of 2-ethylhexyl dichlorophosphate held at 50° C. there were slowly added during 0.5 hour 71 grams (0.5 mol) of glycidyl methacrylate containing 0.08 gram of 1,3,5-trinitrobenzene as polymerization inhibitor. The reaction mixture then was washed with 100 grams of a 10% aqueous solution of trisodium citrate, the resultant oily layer was washed with water, 0.33 gram of 1,3,5-trinitrobenzene added, and the layer stripped by distillation to a kettle temperature of 50° C. under a pressure of less than 2 mm. of mercury. The colorless liquid residue of 2-ethylhexyl di-(2-methacrylyloxy-2-chloropropyl) phosphate

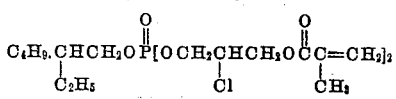

was secured in 89% yield, based upon the phosphorus-containing reactant. It had a $n_D^{30}=1.4694$, and the following analysis:

| Analysis | Found | Theory |
| --- | --- | --- |
| C, percent by weight | 49.57 | 49.77 |
| P, percent by weight | 5.79 | 5.83 |
| H, percent by weight | 6.97 | 7.02 |
| Cl, percent by weight | 13.18 | 13.34 |

Example 4

Following the general procedure described in Example 3, 1.58 mols of diethyl chlorophosphate were reacted with 1.65 mols of glycidyl methacrylate in the presence of 2 grams of titanium tetrachloride and 0.3 gram of 1,3,5-trinitrobenzene. The stratification of the reaction mixture was facilitated by the addition thereto of 100 cc. of ethylene dichloride. The residual diethyl 2-methacrylyloxy-2-chloropropyl phosphate,

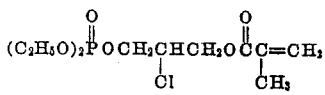

secured in excellent yield, had $n_D^{30}=1.4484$. It yielded the following on analysis:

| Analysis | Found | Theory |
| --- | --- | --- |
| C, percent by weight | 41.13 | 42.00 |
| P, percent by weight | 9.78 | 9.85 |
| H, percent by weight | 6.24 | 6.41 |
| Cl, percent by weight | 11.00 | 11.26 |

Example 5

To an agitated solution of 1 gram of titanium tetrachloride in 169 grams (0.69 mol) of di-(2-chloroethyl) chlorophosphate were added during an hour 225 grams (0.66 mol) of 98.5% glycidyl oleate while maintaining a temperature of 70° C. by cooling. After an additional 6 hours at 70° C. the reaction mixture was washed with 1,000 cc. of a 10% aqueous solution of trisodium citrate, the resultant oily layer separated, washed with water and stripped by distillation to a kettle temperature of 100° C. under a pressure of less than 1 mm. of mercury. The residual di-(2-chloroethyl) oleoyloxychloropropyl phosphate,

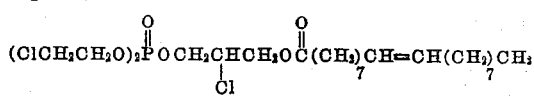

secured in high yield, had a chlorine content of 18.37% (theory; 18.35%).

Example 6

To an agitated solution of 0.5 gram of titanium tetrachloride in 32 grams (0.14 mol) of 2-chloro-5-ethyl-2-oxo-4-propyl-1,3,2-dioxaphosphorinane held at 50° C. were added dropwise during 0.25 hour 20 grams (0.14 mol) of glycidyl crotonate containing 0.02 gram of 1,3,5-trinitrobenzene. The reaction mixture was washed with 100 cc. of a 10% aqueous solution of trisodium citrate, the resultant oily layer which separated was washed with water, 0.1 gram of 1,3,5-trinitrobenzene added, and this solution stripped by distillation to a kettle temperature of 50° C. under 4 mm. of mercury pressure. The residual liquid, 2-crotonyloxychloropropoxy-5-ethyl-2-oxo-4-propyl-1,3,2-dioxaphosphorinane,

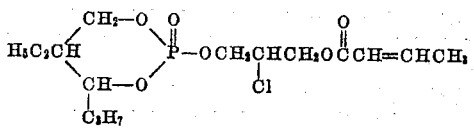

had $n_D^{30}=1.4739$; and the following analysis:

| Analysis | Found | Theory |
| --- | --- | --- |
| C, percent by weight | 47.71 | 48.87 |
| P, percent by weight | 8.47 | 8.47 |
| H, percent by weight | 6.96 | 6.84 |
| Cl, percent by weight | 11.04 | 9.62 |

Example 7

To an agitated solution of 0.5 gram of stannic tetrachloride in 90 grams (0.4 mol) of 2-chloro-5-ethyl-2-oxo-1,3,2-dioxaphosphorinane there were added dropwise 60 grams (0.42 mol) of glycidyl methacrylate containing 0.12 gram of 1,3,5-trinitrobenzene while cooling to maintain the reaction mixture at 50° C. After 1.25 hours the mixture was washed with 100 grams of a 10% aqueous trisodium citrate solution and then with two 50 cc. portions of water. An additional 0.24 gram of 1,3,5-trinitrobenzene was added and the mixture stripped by distillation at 50° C. under a pressure of less than 2 mm. of mercury. The residual clear, light yellow liquid, 5-ethyl-2-methacrylyloxychloropropoxy-2-oxo-4-propyl-1,3,2-dioxaphosphorinane, was secured in 76% yield, based upon the phosphorus-containing reactant. It had $n_D^{30}=1.4733$; and contained 9.52% of chlorine, by weight (theory=9.62). A considerable amount of polymers was present.

Example 8

5-butyl-5-ethyl-2-methacrylyloxybromopropoxy-2-oxo-1,3,2-dioxaphosphorinane was prepared in 82% yield by the addition of 22 grams (0.155 mol) of glycidyl methacrylate containing 0.02 gram of trinitrobenzene to an agitated solution of 0.6 gram of titanium tetrachloride in 40 grams (0.14 mol) of 2-bromo-5-ethyl-5-butyl-2-oxo, 1,3,2-dioxaphosphorinane while cooling to maintain a reaction temperature of 50° C. The mixture was cooled to 25° C. and agitated for an hour with 15 grams of trisodium citrate in 30 grams of water. Fifty cc. of ethyl ether were added, the oily layer separated, washed with water, and stripped by distillation at 50° C. under a pressure of less than 2 mm. of mercury. The residual

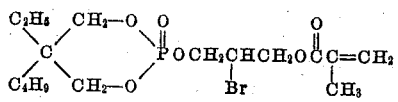

was a viscous yellow liquid having the following properties: $n_D^{30}=1.4811$; acidity=0.04 cc. of a normal solution of a base.

It analyzed as follows:

| Analysis | Found | Theory |
| --- | --- | --- |
| C, percent by weight | 44.84 | 45.00 |
| P, percent by weight | 7.02 | 7.25 |
| H, percent by weight | 6.81 | 6.61 |
| Br, percent by weight | 18.93 | 18.71 |

A yield of 82%, based upon the phosphorus-containing reactant, was secured.

Example 9

Tri-(methacrylyloxychloropropyl) phosphate,

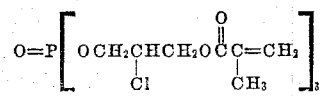

was prepared by the dropwise addition of 43 grams (0.3 mol) of glycidyl α-methacrylate, inhibited with 0.1 gram of 1,3,5-trinitrobenzene and 0.02 gram of hydroquinone, to an agitated solution of 15 grams (0.1 mol) of phosphoryl chloride, 1.0 gram of titanium tetrachloride, and 73 grams of methylene chloride, while maintaining the mixture at 25°–30° C. for a total of 7.75 hours. It then was stored for around 65 hours at −20° C. The clear red-brown liquid reaction mixture then was neutralized at 25° C. with 150 grams of a 20% aqueous solution of trisodium citrate, 200 cc. of ethyl ether were added, and the mixture filtered. The oil layer that separated from the filtrate was washed with 100 cc. of water and 0.2 gram of phenyl α-naphthylamine added as inhibitor. The washed filtrate then was stripped by distillation to a kettle temperature of 0° to 5° C. under a pressure of less than 2 mm. of mercury during 4 hours. The residual tri-(methacrylyloxychloropropyl) phosphate was secured in the form of 45 grams of a clear, red, acetone-soluble liquid that was very fluid at 25° C., and had $n_D^{30}=1.4884$; percent P, by weight=4.76 (theory=5.35). The monomer polymerized quickly at 70° C. in the air and in the absence of an added catalyst to yield a hard, brown glassy resin which was insoluble in boiling acetone.

Example 10

To an agitated solution of 134 grams (0.5 mol) of diphenyl chlorophosphate and 2 grams of aluminum chloride there were added dropwise during 15 minutes 71 grams (0.5 mol) of glycidyl methacrylate containing 0.07 gram of 1,3,5-trinitrobenzene while cooling to maintain the reaction temperature at 50° C. After another hour at 25° C. the mixture was neutralized with 120 grams of a 16.7% aqueous trisodium citrate solution. After adding 100 cc. of ethyl ether the oil layer which separated was washed with water and stripped by fractional distillation to a kettle temperature of 50° C. under a pressure of less than 2 mm. of mercury, after adding 0.4 gram of 1,3,5-trinitrobenzene. The 168 grams of diphenyl methacrylyloxy-chloropropyl phosphate,

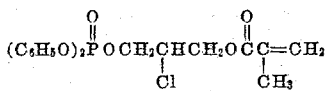

had $n_D^{30}=1.5276$; sp. gr. at 25°/15°=1.262.

Analysis, percent by weight: chlorine=8.74 (theory=8.63); carbon=54.35 (theory=55.60); hydrogen=4.85 (theory=4.91).

Example 11

Under conditions generally similar to those recited in Example 10, excepting that 1 gram of titanium tetrachloride was used as the catalyst, substantially similar results were secured.

Example 12

Di-(methacrylyloxychloropropyl) benzenephosphonate,

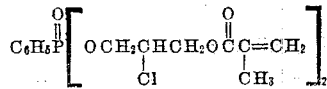

was prepared by the dropwise addition of 71 grams (0.5 mol) of glycidyl methacrylate containing 0.07 gram of 1,3,5-trinitrobenzene to an agitated solution of 49 grams (0.25 mol) of benzenephosphonyl dichloride and 1 gram of titanium tetrachloride while maintaining the reaction mixture at 50° C. for 45 minutes. The reaction mixture then was neutralized with 100 grams of a 15% aqueous trisodium citrate solution, washed with water until neutral to litmus, 0.03 gram of 1,3,5-trinitrobenzene added, and the mixture stripped by distillation to a kettle temperature of 50° C. under a pressure of 2 mm. of mercury. The yellow fluid residue product had the following properties: $n_D^{30}=1.5098$; percent phosphorus, by weight, 6.25 (theory=6.46); percent chlorine, by weight, 15.71 (theory=14.79); yield=71% based upon the phosphorus-containing reactant.

The following examples illustrate the ease with which monomers of the invention polymerize. In Examples 13 to 18 the specified amounts of the monomer and the polymerization catalyst were charged into an open-ended glass tube 4" in length and heated to the temperature indicated. In each case the polymerization was affected within a two-minute interval.

Example 13

Three grams of 2-ethylhexyl di-(methacrylyloxychloropropyl) phosphate containing 0.005 gram of benzoyl peroxide polymerized at 110° C. to a clear, light yellow glassy solid.

Example 14

Three grams of diethyl methacrylyloxychloropropyl phosphate containing 0.006 gram of benzoyl peroxide polymerized at 130° C. to a brown, tacky solid.

Example 15

Three grams of 5-butyl-5-ethyl-2-(methacrylyloxychloropropoxy)-2-oxo-1,3,2-dioxaphosphorinane containing 0.003 gram of benzoyl peroxide polymerized at 110° C. to a shiny yellow, tacky solid.

Example 16

Three grams of di-(methacrylyloxychloropropyl)benzenephosphonate containing 0.003 gram of benzoyl peroxide polymerized at 100° C. to a clear, yellow, glassy solid.

Example 17

Three grams of diphenyl methacrylyloxychloropropyl phosphate containing 0.003 gram of benzoyl peroxide polymerized at 110° C. to a clear almost colorless, tacky solid.

Example 18

Five grams of 5-ethyl-2-(methacrylyloxychloropropoxy)-2-oxo-4-propyl-1,3,2-dioxaphosphorinane containing 0.006 gram of benzoyl peroxide polymerized at 110° C. to a clear, yellow, tacky solid.

It will be noted that in each instance herein, the radical designated by Y is free from olefinic unsaturation.

The invention is susceptible of modification within the scope of the appended claims.

I claim:

1. A polymerizable ester of an acid of phosphorus, said ester having a structure corresponding to the formula

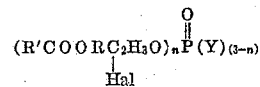

wherein R′ designates an unsaturated hydrocarbon radical having at least one and not more than two olefinic double bonds and up to 20 carbon atoms; R designates a divalent saturated hydrocarbon radical having 1 to 2 carbon atoms; Hal designates a halogen of the class consisting of chlorine and bromine; and each Y respectively designates a radical free from olefinic unsaturation and of the class consisting of chlorine, bromine, and the alkoxy, aryloxy, aryl, chloroalkoxy, bromoalkoxy, chloroaryloxy and bromoaryloxy radicals, and two Y's together designate the group —OCR²R³CR⁴R⁵CHR⁶O— wherein each R², R³, R⁴, R⁵ and R⁶, respectively, designates a member of the class consisting of hydrogen and the alkyl groups; and $n$ is an integer from 1 to 3.

2. A polymerizable phosphoric acid ester containing at least one methacrylyloxyhalopropoxy group selected from the class consisting of the methacrylyloxychloropropoxy and the methacrylyloxybromopropoxy groups and directly attached to a phosphorus atom, any remaining phosphorus bonds being satisfied by an oxo radical and not more than two alkoxy groups.

3. A polymerizable phosphoric acid ester containing at least one methacrylyloxyhalopropoxy group selected from the class consisting of the methacrylyloxychloropropoxy and the methacrylyloxybromopropoxy groups and directly attached to a phosphorus atom, any remaining phosphorus bonds being satisfied by an oxo radical and not more than two haloalkoxy groups.

4. A polymerizable phosphoric acid ester containing a methacrylyloxyhalopropoxy group selected from the class consisting of the methacrylyloxychloropropoxy and the methacrylyloxybromopropoxy groups and directly attached to a phosphorus atom, any remaining phosphorus bonds being satisfied by an oxo radical and a

—OCR²R³CR⁴R⁵CHR⁶O— group, wherein each $R^2$, $R^3$, $R^4$, $R^5$ and $R^6$, respectively, designates a member of the class consisting of hydrogen and the alkyl groups.

5. As a new compound, 5-ethyl-2-methacrylyloxychloropropoxy-2-oxo-4-propyl-1,3,2-dioxaphosphorinane.

6. As a new compound, 2-ethylhexyl bis(3-methacrylyloxy-2-chloropropyl) phosphate.

7. As a new compound, diethyl (3-methacrylyloxy-2-chloropropyl) phosphate.

8. As new compounds, polymerizable phosphate esters having directly attached to the phosphorus atom three organic radicals, at least one of such radicals being the oleoyloxychloropropoxy radical, and any remainder of such organic radicals being chloroalkoxy radicals.

9. As new compounds, polymerizable phosphate esters having directly connected to the phosphorus atom three organic radicals, at least one of such radicals being the methacrylyloxychloropropoxy radical, and any remainder of such radicals being alkoxy radicals.

10. As a new compound, a di(methacrylyloxychloropropyl)benzene phosphonate.

11. As a new compound, a 2-methacrylyloxyhalopropyl phosphate ester selected from the class consisting of the 2-methacrylyloxychloropropoxy and the 2-methacrylyloxybromopropoxy phosphate esters and having directly attached to the phosphorus atom both free bonds of a —OCR²R³CR⁴R⁵CHR⁶O— group wherein $R^2$, $R^3$, $R^4$, $R^5$ and $R^6$, respectively, designates a radical of the class consisting of hydrogen and the alkyl groups.

12. As a new compound, 5-ethyl-2-methacrylyloxyhalopropoxy-2-oxo-4-propyl-1,3,2-dioxaphosphorinane.

13. Process for making olefinically unsaturated acyloxy haloalkoxy compounds of phosphorus, which comprises reacting an epoxy-containing ester of an unsaturated aliphatic monocarboxylic acid, in the presence of a metallic halide catalyst for the addition reaction selected from the class consisting of the halides of titanium, of zirconium, of aluminium and of tin, with a phosphorus compound of the general formula

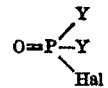

wherein each Y represents a radical free from olefinic unsaturation and of the class consisting of chlorine, bromine, and the alkoxy, chloroalkoxy, bromoalkoxy, aryloxy, aryl, chloroaryloxy and bromoaryloxy radicals, and two Y's together designate the group —OCR²R³CR⁴R⁵CHR⁶O— wherein each $R^2$, $R^3$, $R^4$, $R^5$ and $R^6$, respectively, designates a radical of the class consisting of hydrogen and the alkyl groups.

14. Process for making olefinically unsaturated acyloxy haloalkoxy compounds of phosphorus, which comprises reacting an epoxy-containing ester of an unsaturated aliphatic monocarboxylic acid having a structure represented by the formula

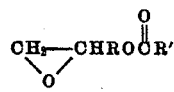

wherein R designates a divalent saturated hydrocarbon radical having 1 to 2 carbon atoms, and R' designates a hydrocarbon radical containing at least one and not more than two olefinic double bonds and up to 20 carbon atoms in the presence of a catalyst selected from the class consisting of the halides of titanium, zirconium, aluminium and tin, with a phosphorus compound of the general formula

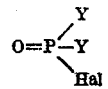

wherein each Y designates a radical free from olefinic unsaturation and of the class consisting of chlorine, bromine, and the alkoxy, chloroalkoxy, bromoalkoxy, aryloxy, aryl, chloroaryloxy and bromoaryloxy radicals, and two Y's together designate the group —OCR²R³CR⁴R⁵CHR⁶O— wherein $R^2$, $R^3$, $R^4$, $R^5$ and $R^6$, respectively designates a radical of the class consisting of hydrogen and the alkyl groups.

15. A homopolymer of the ester set forth in claim 1.
16. A homopolymer of the ester set forth in claim 2.
17. A homopolymer of the ester set forth in claim 3.
18. A homopolymer of the ester set forth in claim 4.

References Cited in the file of this patent

UNITED STATES PATENTS 2,559,854    Dickey _____ July 10, 1951

OTHER REFERENCES

Kosolapoff: "Organophosphorus Compounds," page 230, Wiley (1950).